3,360,481
CATALYST ACTIVATION PROCESS
Donald Danley McLaren, Plainfield, N.J., and Alfred Douglas Reichle, Baton Rouge, La., assignors to Esso Research and Engineering Company, a corporation of Delaware
No Drawing. Filed June 3, 1964, Ser. No. 372,384
12 Claims. (Cl. 252—420)

ABSTRACT OF THE DISCLOSURE

A method of activating a hydrogenation catalyst comprising (1) contacting said catalyst with a substantially dry, hydrogen containing gas stream at a temperature up to about 300° F., (2) thereafter contacting said catalyst with an undried gas stream comprising hydrogen at a temperature above 300° F. The catalyst thus activated is at least, as active as one activated completely with a dry gas.

---

This invention relates to the activation of molecular sieve catalysts. Particularly, it relates to the activation of a hydrocracking catalyst comprising a crystalline aluminosilicate zeolite having uniform pore openings between about 6 and 15 A., containing less than about 10 wt. percent alkali metal oxide, and composited with a platinum group metal or metal compound.

Hydrocracking has recently become a subject of considerable interest within the petroleum industry because of certain particularized advantages it offers over conventional catalytic cracking processes. The hydrocracking process is generally carried out at temperatures of from about 450° to 1000° F., preferably 600° to 750° F.; pressures of from about 200 to about 3000 p.s.i.g., preferably 1200 to 1800 p.s.i.g.; liquid hourly space velocities of from about 0.1 to about 10, preferably 0.5 to 3, volumes of feed per volume of catalyst per hour; and hydrogen rates of from about 1000 to about 25,000, preferably 2000 to 12,000, s.c.f. per barrel of feed.

Recently, a markedly improved hydrocracking catalyst has been developed which comprises a crystalline aluminosilicate zeolite having a platinum group metal deposited thereon or incorporated therein. This catalyst has been found to exhibit relatively high activity and activity maintenance, even in the presence of substantial quantities of nitrogen. It has particularly been found that the crystalline alumino-silicate zeolites having effective pore diameters of about 6 to 15 A. when composited with the platinum group metal, and particularly after base exchange to reduce the alkali metal oxide, e.g. $Na_2O$, content of the zeolite to less than about 10 wt. percent, are highly efficient hydrocracking catalysts.

Natural-occurring large pore crystalline alumino-silicate zeolites may be exemplified by the minerals faujasite, chabazite, analcite, etc. The synthetically-produced alumino-silicate zeolites will be preferred in the process of the present invention, of which synthetic faujasite will be particularly preferrd. The processes for synthetically producing crystalline alumino-silicate zeolites (i.e. "molecular sieves") are well known in the art, as typified, for example, by those disclosed in U.S. 2,882,244 and 2,971,904. In general, these processes involve crystallization from aqueous reaction mixtures containing $Al_2O_3$ as sodium aluminate, alumina sol and the like; $SiO_2$ as sodium silicate, and/or silica gel and/or silica sol; and an alkaline hydroxide, e.g. $Na_2O$, either free and/or in combination with the above components. The reactant ratios are maintained within critically prescribed ranges according to the type of zeolite desired.

As mentioned above, it is preferable to reduce the alkali metal oxide content of the crystalline zeolite. This is conveniently accomplished by ion exchange with hydrogen-containing cations and cations of metals in Groups I to VIII and rare earth metals, preferably the metals in Groups II, III, IV, V, VI–B, VII–B, VIII and the rare earth metals. Where a hydrogen-containing cation is used to replace the alkali metal (e.g. sodium), the "hydrogen" form of the zeolite is produced. A convenient method of preparing this form is to subject the zeolite to base exchange with an ammonium cation solution, followed by calcining at elevated temperatures, e.g. 600 to 1000° F., to drive off ammonia and water.

The base-exchanged crystalline zeolite is composited with the platinum group metal, either before or after the above-mentioned calcination step, by treatment with a solution of a platinum group metal salt or ammonium complex, e.g. ammonium chloroplatinate, ammoniacal palladium chloride, etc. The amount of platinum group metal in the finished catalyst is ordinarily between about 0.01 and 5.0 wt. percent, preferably 0.1 to 3.0 wt. percent based on the zeolite. Palladium will be the preferred metal.

The base-exchanged crystalline zeolite containing a platinum group metal is then calcined. The calcination step is normally carried out after the catalyst has been put in its final mechanical form, e.g. pills or extrudate, by contact with a flowing stream of dry air at temperatures up to 1000° F.

The catalyst prepared by the above-described general techniques is now ready for activation in accordance with the present invention.

Activation of a catalyst of the nature described above involves initial reduction of the platinum group metal (preferably palladium) and the dehydration of the sieve under conditions such that crystallites of the metal are not formed and the sieve structure is not destroyed. Conventional methods of activating this type of catalyst involve extended treatment with once-through dry hydrogen at atmospheric pressure and elevated temperature. However, operation at atmospheric pressure is commercially impractical when the catalyst is to be used in a process operating under pressure, such as hydrocracking, because of the need for special gas-handling equipment to supply the requisite quantities of once-through hydrogen, which equipment would be on a stand-by basis for most of the life of the catalyst. It is evident, therefore, that it would be highly desirable to accomplish the activation under hydrocracking unit pressure, e.g. about 1200 to 1800 p.s.i.g., using a recycle hydrogen stream to supply the required heat to the catalyst. An added advantage to such a procedure would be that the recycle gas compressors (which normally operate at unit pressure to recycle unused hydrogen back to the hydrocracking reactor) could be conveniently employed in the activation process without the need for special gas-handling equipment. However, indiscriminate recycle of hydrogen is contraindicated since successful activation of these crystalline zeolite hydrocracking catalysts has generally required the use of a dry hydrogen atmosphere. Accordingly, costly high pressure driers in the hydrocracker recycle gas system would be required to remove the water that is being driven from the catalyst during activation. One purpose of the present process, therefore, is to eliminate the need for such high pressure driers, by using an undried recycle hydrogen stream in the final stages of activation.

Another important consideration in the activation of these crystalline zeolite catalysts is that too rapid a heat-up period will cause rupture of the sieve cell structure due to excessive rates of water removal. Accordingly, another purpose of the present invention is to provide a means for initially reducing the water content of the catalyst prior to its being heated to final activation temperature.

In accordance with the present invention, a platinum group metal-containing crystalline zeolite catalyst is first contacted with a substantially dry, e.g. less than 10 p.p.m. $H_2O$, hydrogen or hydrogen-containing gas stream at a temperature of about 300° F. or below until less than about 50 p.p.m., preferably less than about 10 p.p.m. water is detected in the exit gas stream. The time period will vary with the pressure of the activation gas and the initial water content of the catalyst. Once the water content of the exit gas stream has reached this low value, this initial contacting stage may be terminated.

Preferably, the above initial contacting stage is performed in two steps: (1) treatment at ambient temperature until the water content of the exit gas has been reduced to below the above levels, followed by (2) slowly increasing the temperature of the catalyst bed to about 300° F. (e.g. at about 60° to 100° F./hr.), and holding at this temperature until the water content of the exit gas has again been reduced to the above levels.

The pressure of the above initial contacting stage may range from atmospheric to the hydrocracking unit pressure (e.g. 1500 p.s.i.g.). In one embodiment of the invention the pressure in both steps (1) and (2) will be within the range of 200 to 2000 p.s.i.g., preferably 1200 to 1800 p.s.i.g. In a more preferred embodiment, which eliminates the need for high pressure drying equipment, step (1) above is performed at atmospheric pressure and step (2) above is performed at a pressure between atmospheric and hydrocracking unit pressure, e.g. 200 to 2000 p.s.i.g., preferably 1200 to 1800 p.s.i.g.

After the above initial contacting stage, by which substantial quantities of water have been removed from the catalyst, the catalyst is slowly heated (e.g. at a rate of about 60 to 70° F./hr.) to the final activation temperature which will be above about 300° F., e.g. 600 to 900° F., preferably 650 to 750° F., and held at said temperature for a sufficient time to substantially complete the activation, e.g. 1 to 12, preferably 2 to 3 hours. The pressure is concurrently increased, if necessary, to the hydrocracking unit pressure, i.e. about 300 to 2000 p.s.i.g., preferably 1200 to 1800 p.s.i.g., e.g. 1500 p.s.i.g. This high pressure is employed in order to increase the specific heat of the gas stream in order to supply sufficient heat to activate the catalyst in the shortest possible time and thereby avoid prolonged heating times. Instead of employing once-through dry hydrogen in this final activation stage, which as previously mentioned is very costly, an undried recycle hydrogen stream may safely be employed provided that the initial contacting stage has properly been performed in accordance with the above procedures. The need for high pressure driers is thus obviated and the hydrogen stream is conveniently recycled using the recycle gas compressors customarily employed in the hydrocracking operation.

The hydrogen gas stream employed in all of the above steps may be substantially pure hydrogen or may contain a minor proportion, e.g. 3 to 7 vol. percent, of an inert gas such as methane or ethane.

A convenient and preferred source of hydrogen is the "make" or "tail" gas from a catalytic reformer consisting substantially of hydrogen (65–95%), but containing minor amounts of light hydrocarbons comprising largely methane, ethane and propane. The use of reformer tail gas will be particularly preferred in the above-described embodiment of the invention involving the use of an intermediate pressure in step (2) of the initial contacting stage. Reformers, being conventional operating units in most petroleum refineries, provide a convenient and readily accessible supply of hydrogen. More importantly, reformers are usually equipped with recycle gas driers, e.g. silica-alumina or alumina driers, which are designed to operate at pressures up to reformer unit pressure, e.g. 200–650 p.s.i.g. Thus, the exit gas from a reformer recycle gas drier serves admirably as a source of dry hydrogen which can conveniently be pressurized to the intermediate pressure of the above step (2) without the need for special gas-handling equipment. Furthermore, since dry hydrogen is not needed in the final activation stage of the present process, the reformer tail gas may simply be recycled over the hydrocracking catalyst at hydrocracking unit pressure without the need for additional high pressure drying equipment.

To briefly summarize, the most preferred embodiment of the invention involves contacting the unactivated catalyst with reformer tail gas in three steps, namely:

(a) Once-through contacting with dry gas at ambient temperature and essentially atmospheric pressure until the exit gas stream shows less than 50, preferably less than 10 p.p.m. water;

(b) Heating to about 300° F., at a preferred rate of about 60° to 70° F./hr., and holding at about 300° F., while contacting with once-through dry gas at maximum reformer unit pressure (e.g. about 200 to 650 p.s.i.g.), until the water content is again reduced to said levels; and (c) Pressurizing with initially dry gas and recycling the gas, without further drying, at hydrocracker unit pressure (300 to 2000, preferably 1200 to 1800 p.s.i.g.) while heating to and holding at a temperature of 600 to 900, preferably 650 to 750° F. The heat-up rate in this step will preferably be about 60° to 70° F./hr. The dry gas used in step (b) is conveniently supplied from conventional reformer recycle gas driers which inherently operate at reformer unit pressure. The recycling of the activation gas at high pressure in step (c) is conveniently handled by the hydrocracker recycle gas system which, of course, is designed to operate at such pressure. As mentioned, this recycle stream is not dried during the final high pressure activation stage.

The invention may be further illustrated by reference to the following examples which are not intended to be limiting.

EXAMPLE 1

A palladium-containing crystalline alumino-silicate zeolite catalyst containing about 0.5 wt. percent palladium, about 2 wt. percent $Na_2O$, and about 1.2 wt. percent water; and having a silica-to-alumina mole ratio of about 5:1 and an average pore diameter of about 13 A., was activated by the following techniques of which Procedure A is a conventional technique and Procedure B is illustrative of the present invention.

Procedure A

FINAL ACTIVATION WITH DRY HYDROGEN AT ELEVATED TEMPERATURE AND PRESSURE

The catalyst was contacted with a stream of once-through dry hydrogen containing 5 vol. percent methane at a rate of 715 s.c.f./ft.$^3$/hr. and at a pressure of 1500 p.s.i.g. It was heated to 700° F. according to the following pattern:

Hold at ambient temperature for 1 hour;
Heat to 700° F. at a rate of 70° F./hr.;
Hold at 700° F. for 2 hours.

Procedure B

FINAL ACTIVATION WITH UNDRIED HYDROGEN BY THE PROCESS OF THE INVENTION

The catalyst was first continuously contacted with a stream of once-through dry hydrogen containing 5 vol. percent methane at ambient temperature (about 80° F.) and 1500 p.s.i.g., until (after about one hour) less than about 10 p.p.m. water was detected in the exit gas stream. The catalyst was then heated to 300° F., under the same pressure, at a rate of about 100° F./hr., and held at this temperature for about one hour until less than about 10 p.p.m. water was again detected in the exit gas stream. At this point, the once-through operation was terminated and the hydrogen stream was continuously recycled without drying at the same pressure (hydrocracking unit pressure, 1500 p.s.i.g.), while the catalyst was heated to 700° F. at a rate of 60° to 70° F./hr. The catalyst was then held at this temperature and pressure in contact with the undried recycle gas for 2 hours, at which point the activation was complete. A hydrogen gas rate of 1420 s.c.f./ft.$^3$/hr. was employed throughout.

After each of the above activation procedures the catalyst was evaluated for relative hydrocracking activity by the following procedure:

Following activation, the temperature was reduced to 500° F., the gas rate was maintained at 1420 s.c.f./ft.$^3$/hr., and the pressure was maintained at 1500 p.s.i.g. A 400–650° F. light catalytic cycle oil feed containing 40 p.p.m. nitrogen was employed. Temperature was increased to maintain conversion to lighter boiling (400° F.$^-$) products at 50 volume percent. After the catalyst had equilibrated, tests were made to determine the space velocity (v./v./hr.) necessary to obtain 50% conversion at 670° F., 1500 p.s.i.g., 8000 s.c.f. gas (88% H$_2$) per barrel. This space velocity was used as a measure of catalyst activity. In Table I, the space velocities are expressed as percentages of that obtained by a standard procedure taken as 100%.

TABLE I.—COMPARISON OF HYDROCRACKING CATALYST ACTIVATION PROCEDURES

|  | Final Activation Conditions | Relative Hydrocracking Activity, Percent |
| --- | --- | --- |
| Procedure: | | |
| A | Once-through dry H$_2$ at 700° F. and 1,500 p.s.i.g. | 108 |
| B | Recycle undried H$_2$ at 700° F. and 1,500 p.s.i.g. | 133 |

As indicated in the above table, Procedure B, illustrative of the activation proces of the present invention, which used undried recycle hydrogen in the final activation step produced a level of catalytic activity greater than that obtained by activation procedure A. It is thus demonstrated that there is no necessity for conducting the final activation step in a dry hydrogen atmosphere which would require the use of costly high-pressure driers in order to operate at the hydrocracking unit pressure. By means of the present invention, fully equivalent catalytic activity may be obtained by operating with undried recycle hydrogen in the final step, provided that the preliminary steps are conducted in accordance with the procedures hereinbefore described to substantially reduce the water content of the catalyst.

EXAMPLE 2

A preferred embodiment of the present invention, which employs reformer tail gas as the hydrogen source, is illustrated by the following procedure.

Reformer tail gas, composed of about 87 vol. percent hydrogen and 13 vol. percent C$_3$$^-$, which has been dried in an alumina drier associated with the reforming process, is utilized to activate a hydrocracking catalyst of the same type employed in Example 1. The hydrocracking catalyst is contained in a suitable hydrocracking reactor which operates at about 1500 p.s.i.g., and about 600° to 800° F. Associated with the hydrocracking reactor are conventional recycle and make-up gas compressors.

After the unactivated hydrocracking catalyst has been charged to the hydrocracking reactor, it is activated in three steps. In the first step, dry reformer tail gas leaving the reformer drier is passed over the hydrocracking catalyst in once-through operation at ambient temperature and atmospheric pressure, until less than about 10 p.p.m. water is detected in the exit gas leaving the hydrocracker.

In the second step, the pressure in the hydrocracker is increased to the maximum pressure attainable in the reformer (about 200 to 650, e.g. 200 to 350, p.s.i.g.). The reformer drier will, of course, be designed to operate at this pressure. Again operating on a once-through basis, the dry reformer tail gas is passed over the hydrocracking catalyst while the catalyst is being heated to about 300° F. at a rate of about 100° F./hr. The catalyst is then held at this temperature until the exit gas leaving the hydrocracker again contains less than about 10 p.p.m. water.

At this point, the third step is initiated and the hydrocracking reactor is pressurized to about 1500 p.s.i.g. with the dry reformer tail gas, using the hydrocracker make-up hydrogen compressor. The gas is recycled at this pressure using the hydrocracker recycle gas compressor, and the catalyst is heated, at a rate of about 60 to 70° F./hr., to a final activation temperature of about 700° F., and held at this temperature in the presence of the undried recycle reformer tail gas until, after about 2 hours, the activation has been completed. A gas rate of about 1500 s.c.f./ft.$^3$/hr. is employed throughout.

An active hydrocracking catalyst having a relative activity substantially equivalent to those shown in Example 1 is produced.

In summary, the present invention provides a convenient and valuable process for activating crystalline zeolite hydrocracking catalysts at hydrocracking unit pressure without the need for expensive high pressure drying equipment. As hereinbefore illustrated, the degree of activation obtained by this process is at least equivalent to the more expensive and cumbersome procedures conventionally employed.

What is claimed is:

1. A process for activating a hydrocracking catalyst comprising a crystalline alumino-silicate zeolite composited with a platinum group metal componest which comprises initially contacting said catalyst, at a temperature up to about 300° F., with a substantially dry gas stream comprising a major proportion of hydrogen until less than about 50 p.p.m. water is detected in said stream after it has contacted said catalyst; and subsequently contacting said catalyst, at elevated pressure and a temperature above about 300° F., with an undried gas stream comprising a major proportion of hydrogen until activation is substantially complete.

2. The process of claim 1, wherein said zeolite contains less than 10 wt. percent alkali metal oxide.

3. The process of claim 1, wherein said gas stream contains a minor amount of a C$_1$ to C$_4$ hydrocarbon.

4. The process of claim 1, wherein said pressure is within the range of about 200 to about 2000 p.s.i.g.

5. The process of claim 1, wherein said temperature above about 300° F. is within the range of from about 600° to about 900° F.

6. A process for activating a hydrocracking catalyst comprising a crystalline alumino-silicate zeolite composited with a platinum group metal component which comprises contacting said catalyst with a substantially dry gas stream comprising a major proportion of hydrogen, at ambient temperature and substantially atmospheric pressure, until less than about 10 p.p.m. water is detected in said stream after it has contacted said catalyst; subsequently contacting said catalyst with said gas stream at a pressure in the range of about 200 to 2000 p.s.i.g. and a temperature up to about 300° F. until less than about 10 p.p.m. water is again detected in said gas stream after it has contacted said catalyst; and finally contacting said catalyst at a temperature above about 300° F. and a pressure of about 300 to 2000 p.s.i.g. in the presence of an undried gas stream comprising a major proportion of hydrogen until activation is substantially complete.

7. The process of claim 6, wherein said zeolite contains less than 10 wt. percent alkali metal oxide.

8. The process of claim 6, wherein said gas stream contains a minor amount of a C$_1$ to C$_4$ hydrocarbon.

9. The process of claim 6, wherein said temperature above about 300° F. is within the range of from about 600° to about 900° F.

10. A process for activating a hydrocracking catalyst comprising a crystalline alumino-silicate zeolite containing less than about 10 wt. percent $Na_2O$ and composited with about 0.01 to 5.0 wt. percent platinum group metal component, which process comprises:
   (1) contacting said catalyst with a substantially dry gas stream comprising a major proportion of hydrogen, at ambient temperature and substantially atmospheric pressure, until less than about 10 p.p.m. water is detected in said stream after it has contacted said catalyst;
   (2) heating said catalyst to a temperature of about 300° F. at a pressure of about 200 to 650 p.s.i.g. in the presence of said dry gas stream, and holding at said temperature until less than about 10 p.p.m. water is again detected in said stream after it has contacted said catalyst; and
   (3) pressurizing said catalyst with said gas stream to a pressure of about 1200 to 1800 p.s.i.g. and heating said catalyst to a temperature of about 650° to 750° F. while recycling said gas stream without drying, and holding at said temperature and pressure until activation is substantially complete.

11. The process of claim 10, wherein said gas stream contains a minor amount of a $C_1$ to $C_4$ hydrocarbon.

12. The process of claim 10, wherein steps (1) and (2) are once-through operations and step (3) is a recycle operation.

References Cited
UNITED STATES PATENTS

| | | | |
|---|---|---|---|
| 3,210,265 | 10/1965 | Garwood | 208—111 |
| 3,234,120 | 2/1965 | Capsuto | 252—411 X |
| 3,254,021 | 5/1966 | Mason et al. | 208—111 |

DANIEL E. WYMAN, *Primary Examiner.*

C. F. DEES, *Assistant Examiner.*

UNITED STATES PATENT OFFICE
CERTIFICATE OF CORRECTION

Patent No. 3,360,481                          December 26, 1967

Donald Danley Mac Laren et al.

It is hereby certified that error appears in the above numbered patent requiring correction and that the said Letters Patent should read as corrected below.

In the heading to the printed specification, line 3, for "Donald Danley McLaren" read -- Donald Danley Mac Laren --.

Signed and sealed this 21st day of January 1969.

(SEAL)
Attest:

Edward M. Fletcher, Jr.                          EDWARD J. BRENNER

Attesting Officer                                Commissioner of Patents